US007539647B2

(12) United States Patent
Xu et al.

(10) Patent No.: US 7,539,647 B2
(45) Date of Patent: May 26, 2009

(54) USING POWER STATE TO ENFORCE SOFTWARE METERING STATE

(75) Inventors: Zhangwei Xu, Redmond, WA (US); Martin H. Hall, Sammamish, WA (US); Isaac Ahdout, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 658 days.

(21) Appl. No.: 11/211,794

(22) Filed: Aug. 25, 2005

(65) Prior Publication Data

US 2007/0050297 A1 Mar. 1, 2007

(51) Int. Cl.
*H04K 1/00* (2006.01)
*G06F 21/22* (2006.01)
*G06F 17/50* (2006.01)
*H04L 9/00* (2006.01)

(52) U.S. Cl. .............................. 705/52; 705/50; 705/51

(58) Field of Classification Search .............. 705/50–52
See application file for complete search history.

(56) References Cited

U.S. PATENT DOCUMENTS 5,386,369 A 1/1995 Christiano
5,557,784 A 9/1996 Dayan et al.
5,654,905 A 8/1997 Mulholland et al.
5,970,498 A 10/1999 Duffield et al.
5,991,402 A 11/1999 Jia et al.
6,016,509 A 1/2000 Dedrick
6,021,492 A * 2/2000 May .............................. 726/1
6,049,798 A 4/2000 Bishop et al.
6,170,014 B1 1/2001 Darago et al.
6,282,573 B1 8/2001 Darago et al.
6,341,274 B1 * 1/2002 Leon .......................... 705/410
6,697,948 B1 * 2/2004 Rabin et al. .................... 726/30
6,816,809 B2 * 11/2004 Circenis ..................... 702/178
6,912,528 B2 * 6/2005 Homer .......................... 707/9
7,216,108 B2 * 5/2007 Hastings et al. ............... 705/63
2002/0010688 A1 * 1/2002 Shah et al. .................. 705/405
2002/0042730 A1 * 4/2002 Homer .......................... 705/8
2003/0135380 A1 7/2003 Lehr et al.

(Continued)

FOREIGN PATENT DOCUMENTS

WO WO-0113199 A1 2/2001

OTHER PUBLICATIONS

O'Brien, J.; Kirk, D.W.; Tweedy, S.B., Remote credit management-an alternative to prepayment meters, IEE, London, UK, 1990, p. 183-188.*

(Continued)

*Primary Examiner*—Calvin L Hewitt, II
*Assistant Examiner*—James Nigh
(74) *Attorney, Agent, or Firm*—Marshall, Gerstein & Borun LLP

(57) ABSTRACT

A pay-per-use or metered-use computer uses directives from an operating system or other software component to determine whether to meter or not. Because such directives may not be trustworthy, a metering system may determine a state of the computer to verify that the metering state complies with a policy. If the metering system determines that the power state is not in keeping with the metering state, the metering system may invoke a sanction, such as restarting metering or placing some or all of the computer in a standby power mode.

6 Claims, 5 Drawing Sheets

U.S. PATENT DOCUMENTS

| | | | | |
|---|---|---|---|---|
| 2004/0019456 | A1* | 1/2004 | Circenis | 702/178 |
| 2005/0010502 | A1* | 1/2005 | Birkestrand et al. | 705/34 |
| 2005/0071688 | A1 | 3/2005 | Hepner et al. | |
| 2006/0100962 | A1* | 5/2006 | Wooldridge et al. | 705/50 |
| 2006/0107328 | A1* | 5/2006 | Frank et al. | 726/26 |
| 2007/0061268 | A1* | 3/2007 | Herold et al. | 705/59 |
| 2008/0005560 | A1* | 1/2008 | Duffus et al. | 713/164 |

OTHER PUBLICATIONS 11211794-281092-EICSearch.doc, 33 pages.*

International Search Report for PCT/US2006/032707 mailed Jan. 5, 2007.

"Express Software Manager Professional," 3 pages printed from http:/www.expressmetrix.com/products/esm.asp on Aug. 25, 2005.

"Software Metering," 3 pages printed from http://www.metaquest.com/solutions/desktopmanagement/metering.html on Aug. 25, 2005.

* cited by examiner

USING POWER STATE TO ENFORCE SOFTWARE METERING STATE

BACKGROUND

Pay-as-you-go or pay-per-use business models have been used in many areas of commerce, from cellular telephones to commercial laundromats. In developing a pay-as-you go business, a provider, for example, a cellular telephone provider, offers the use of hardware (a cellular telephone) at a lower-than-market cost in exchange for a commitment to remain a subscriber to their network. In this specific example, the customer receives a cellular phone for little or no money in exchange for signing a contract to become a subscriber for a given period of time. Over the course of the contract, the service provider recovers the cost of the hardware by charging the consumer for using the cellular phone.

The pay-as-you-go business model is built on metering usage. In the case of a cellular telephone, the metric for metering use is minutes or megabytes of data transported. In a pay-as-you-go business model for computers, where a service provider or underwriter subsidizes the cost of the hardware anticipating future revenue, there are many aspects of usage that can be monitored or metered. However, not all sources of metering data can be uniformly relied on. When data suggests the computer is in use, but is not, the subscriber may not get full value from his or her subscription. Conversely, when the computer is being used but not metered, the service provider does not receive fair compensation.

SUMMARY

The ability to accurately track usage, especially usage related to a metered contract, may be a significant part of a business model that allows subscribers to purchase and use a computer at a lower-than-market price in exchange for subscription payments. However, tracking computer usage can lead to some situations where ambiguity exists as to whether a metered condition exists or not. Metering management is performed in a secure area of the computer, that, by necessity may not trust the software programs that direct metering. Therefore, additional information about the state of the computer may be used to determine if the computer should be metered or not. Power state of the computer and/or its various components is one of the indicators that may be used by the metering processes to determine when metering should occur. When the operating system or similar software component signals that the metering manager should stop metering, the metering manager can monitor power state to confirm the signal. When power usage indicates the computer is still in active use, the metering manager may resume metering, or in one embodiment, force the computer into a low power state or cause a reset.

DETAILED DESCRIPTION OF VARIOUS EMBODIMENTS

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
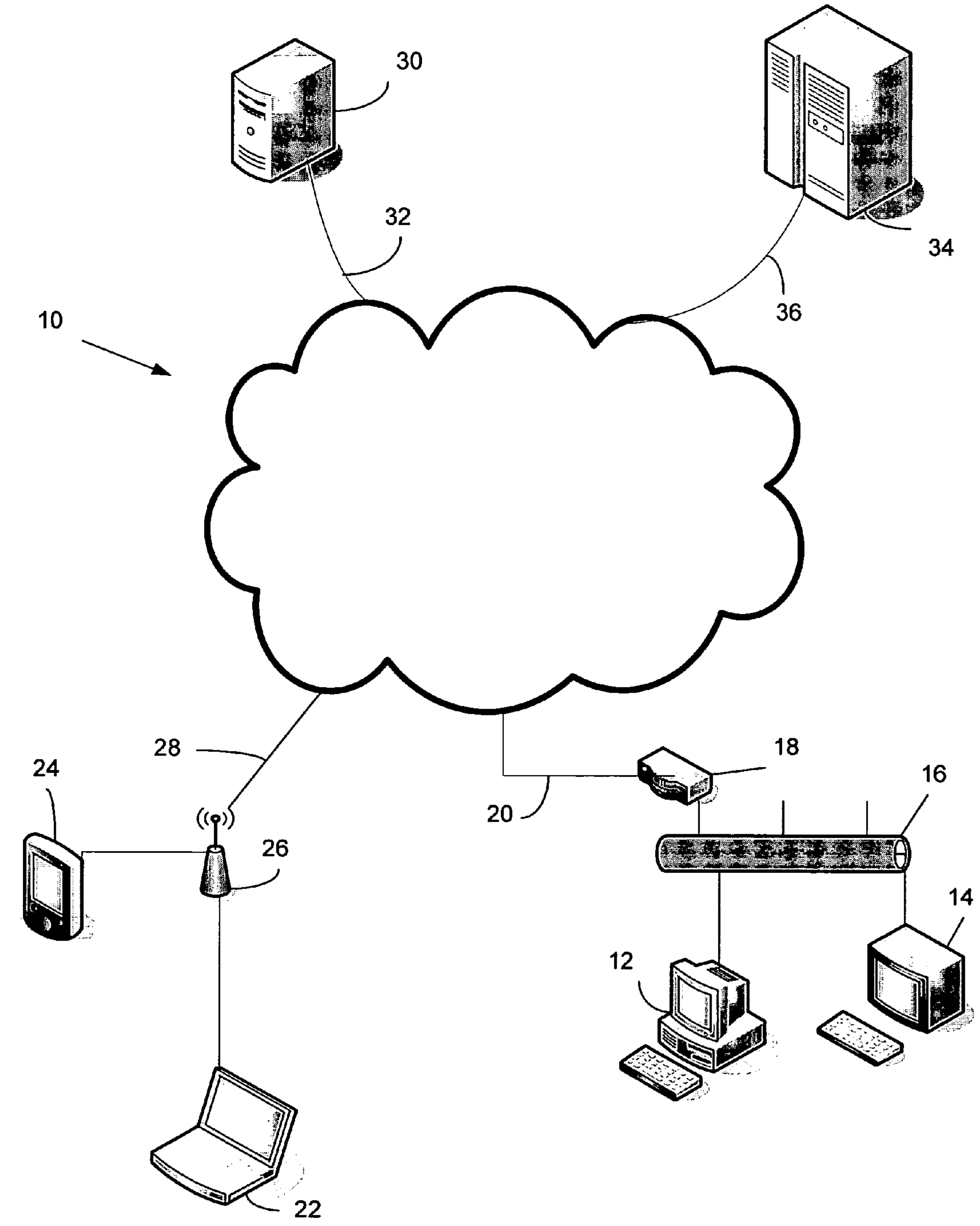
FIG. 1 is a simplified and representative block diagram of a computer network.

FIG. 1 illustrates a network 10 that may be used to implement a pay-per-use computer system. The network 10 may be the Internet, a virtual private network (VPN), or any other network that allows one or more computers, communication devices, databases, etc., to be communicatively connected to each other. The network 10 may be connected to a personal computer 12 and a computer terminal 14 via an Ethernet 16 and a router 18, and a landline 20. On the other hand, the network 10 may be wirelessly connected to a laptop computer 22 and a personal data assistant 24 via a wireless communication station 26 and a wireless link 28. Similarly, a server 30 may be connected to the network 10 using a communication link 32 and a mainframe 34 may be connected to the network 10 using another communication link 36.

Figure 2:
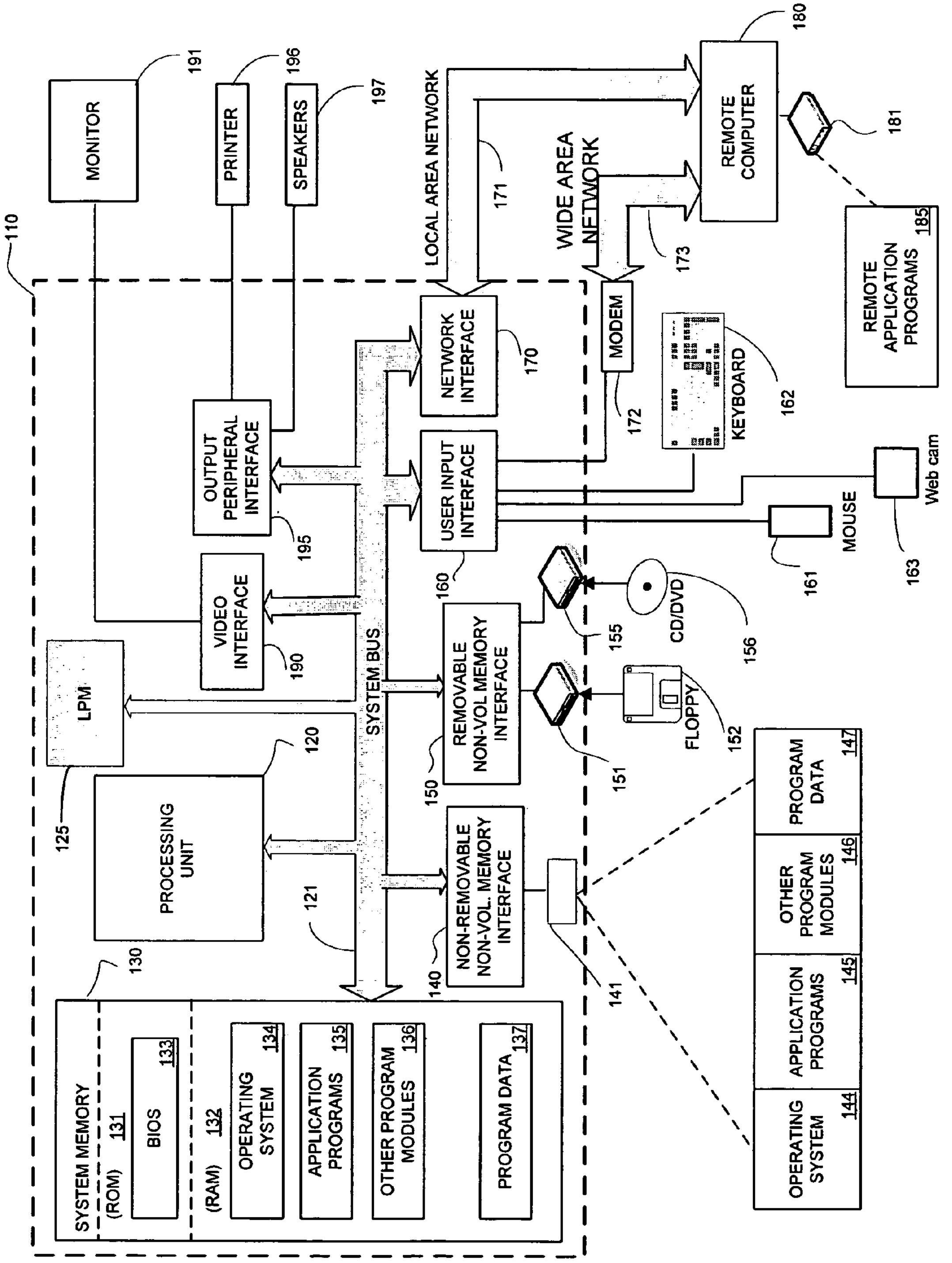
FIG. 2 is a block diagram of a computer that may be connected to the network of FIG. 1.

FIG. 2 illustrates a computing device in the form of a computer 110 that may be connected to the network 10 and used to implement one or more components of the dynamic software provisioning system. Components of the computer 110 may include, but are not limited to a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 may also include a lower provisioning module (LPM) 125. The lower provisioning module 125 is a hardware component of a license provisioning service and has a corresponding software component, an upper provisioning module. The license provisioning service and its major component elements, the upper provisioning module and lower provisioning module 125 are discussed in more detail with respect to FIG. 3. The LPM 125 specifically is discussed in greater detail in FIG. 4. Briefly, the LPM 125 facilitates pay-as-you-go or pay-per-use operation of the computer 110. The LPM 125 manages metering usage, imposing sanctions when metered use is expired, and manages the request, receipt, and processing of data for replenishing the computer 110 for additional metered use. The lower provisioning module 125 may be implemented in hardware as depicted, but may be instantiated in software given an appropriate execution environment in consideration of expected security risks.

The computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 1136, and program data 137.

The computer 110 may also include other removable/non-removable, volatile/nonvolatile computer storage media. By way of-example only, FIG. 2 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other-optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Another input device may be a camera for sending images over the Internet, known as a web cam 163. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Figure 3:
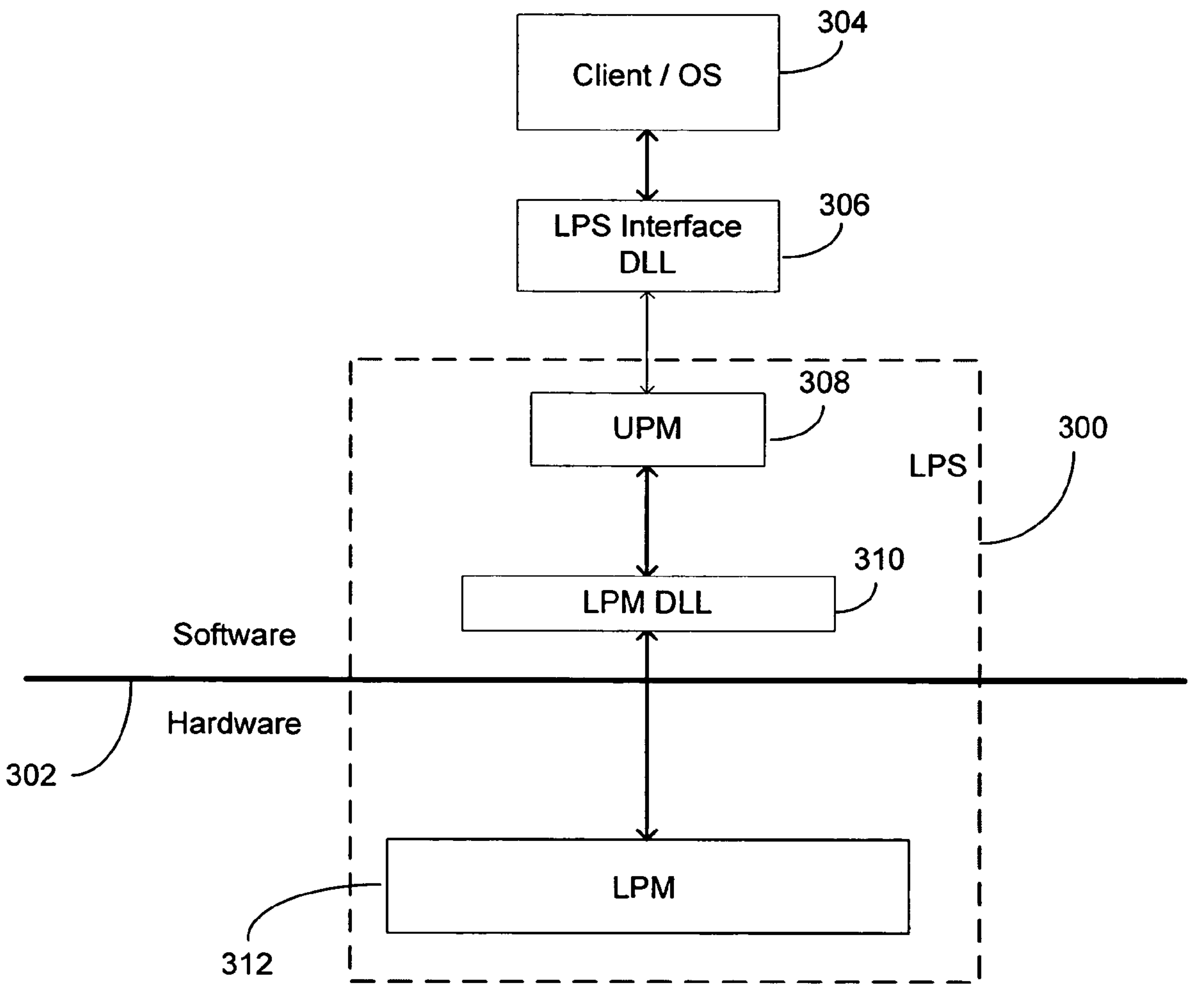
FIG. 3 is a block diagram of a license provisioning service showing external connectivity.

FIG. 3 is a simplified block diagram depicting an implementation of a license provisioning service (LPS). The LPS 300 may act on behalf of a service provider or other operator with an interest in a computer or a component of the computer. The LPS 300 may be used to measure usage (meter), credit and debit a metering account and determine terms-of-use for both the computer as a whole and subsystems such as peripherals and application programs according to a usage policy, to name a few. The LPS 300 may have hardware and software components as depicted by the line 302, with software components above and hardware components below. However, when trusted execution environments exist, even those components shown below the line may be implemented in software. Clients 304, including application programs 135 and the operating system 134, may use the services of the LPS 300. Access to the LPS 300 may be made through a software driver or an interface dynamic link library (DLL) 306 providing command structures and protocols for interacting with the LPS 300.

The upper provisioning module 308 may be the primary software portion of the LPS 300. The software portion of the LPS 300 may also include a DLL 310 for interfacing with the lower provisioning module 312, that is, the hardware portion of the LPS 300. Interrupts (not depicted) may also be used for communication between the upper provisioning module 308 and the lower provisioning module 312. The upper provisioning module 308 may be used to collect software states such as operating system state and application program status. These states may be reported to the LPM 312 for use in determining metering. For example, the UPM 308 may detect an operating system state change between states such as logged on, logged off, logged on_inactive, etc. In addition power state may be monitored. Valid power states may include active, off, standby, or in transition between these states. The UPM 308 may then report the operating system state, or power state, to the lower provisioning module 312. The report from the UPM 308 may also include a directive explicitly stating whether metering should be on or off corresponding to the current state. In another embodiment, the directive may be implicitly taken from the current operating system state, power state, or change between states.

The lower provisioning module 312 may receive an indication that metering should be stopped, for example, when the operating system state is reported to be logged off and would result in the power state changing to standby. The lower provisioning module 312 may then begin its own monitoring process. In one embodiment, a timer may be started for monitoring whether the power state actually reflects the reported state within the timeout period. Confirmation of a change in power state to off or standby may occur automatically in an embodiment where the LPM 312 shares the same power circuit as that being reported. That is, the LPM 312 will itself simply shut off when the power state is actually off or in standby. However, when the lower provisioning module 312 cannot confirm that the power state has actually been changed as reported within the timeout period, a sanction may be imposed.

There may be a delay between a signal reporting that monitoring should cease and a timeout period ending in the LPM 312, as described above. Similarly, there may be a delay between a logon operation or coming out of a standby state and when the LPM 312 resumes metering. The LPM 312 may monitor the duration of a standby period or the duration of the period between logon operations. When the duration of either state is less than a minimum, for example, one minute, the LPM 312 may ignore the state change and meter accordingly.

The LPM 312 may have several choices for sanctioning. In one embodiment, the LPM 312 may simply restart metering. Restarting metering is a relatively low impact sanction and may be accompanied by displaying a message to the user or making a log entry indicating that metering has resumed because the reported state change cannot be confirmed.

In another embodiment, the LPM 312 may take more dramatic action, such as resetting the computer or forcing the change in power state, for example, placing the computer 110 or individual components, such as the video interface 190 into a standby power mode. Obviously, the power off sanction is more dramatic and may be reserved for use after repeated instances of metering sanctions. In another embodiment, a power off sanction may be indicated when the computer is in a state where metering should be active, but metering is not taking place. This may be indicative of a failure in the metering circuit or a successful attempt to circumvent the metering process.

Power off sanctions may also be tailored to different pieces of hardware other than the entire computer. For example, when the computer is logged off but network traffic is observed, the network interface 170 may be powered off or placed in a standby power state. Similarly, if the computer is reported as logged off but music is being played, a peripheral interface 195 supporting speakers may be turned off.

Inconsistencies between reported power state and observed power state may be indicative of intentional fraud attempts and may require more dramatic sanctions sooner than operating system state inconsistencies.

Figure 4:
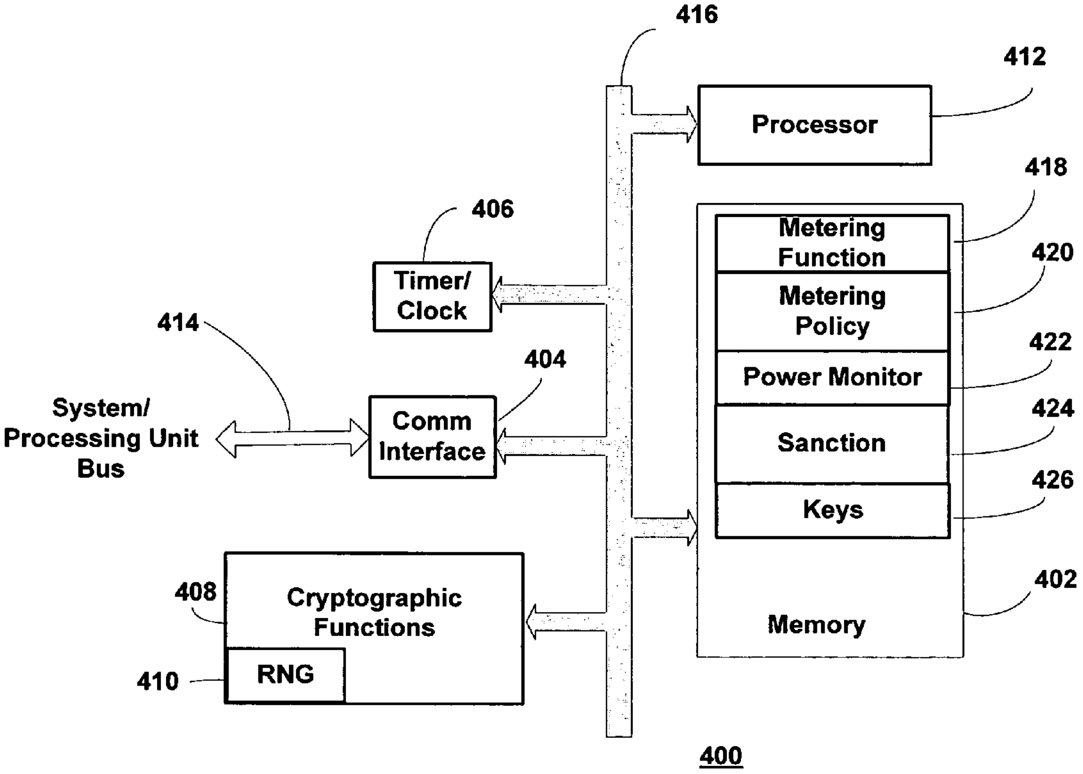
FIG. 4 is a block diagram of a lower provisioning module.

FIG. 4 is a block diagram of a simplified and representative lower provisioning module 400, that may be the same as, or similar to, the LPM 312 of FIG. 3. The lower provisioning module 400 may include a tamper-resistant memory 402, a communication interface 404, a timer or clock 406, a cryptographic circuit 408 with optional random number generator (RNG) 410, and a processor 412. Communication with the computer 110 may be accomplished through a system bus 414 coupled to the communication interface 404. The internal components of the LPM 400 may communicate over an internal bus 416.

The memory 402 may store executable code and data related to the functions of the LPM 400. Metering functions 418 and metering policies 420 may be used to implement various metering options. For example, metering functions 418 may include a subscription, such as unlimited use per month, or metering by time, such as use for a given number of hours. Whether to meter and which metering type to enforce maybe specified by the metering policies 420. A power monitoring function 422 may be used to determine when the power state, or other criteria such as operating system state, is consistent with the data and directives received via the communication interface 404. A sanction function 424 may operate as described above, that is, operate to enforce a metering policy including resuming metering, causing a reset, or interrupting power. The sanction function 424 or the metering policy 420 may also include settings for the timer 406 used to monitor transition from power on to power off/standby states. Cryptographic keys 426 may be used in conjunction with the cryptographic circuit 408 to verify signatures, or in conjunction with other cryptographic functions such as signing, verifying signatures, encryption and decryption.

Figure 5:
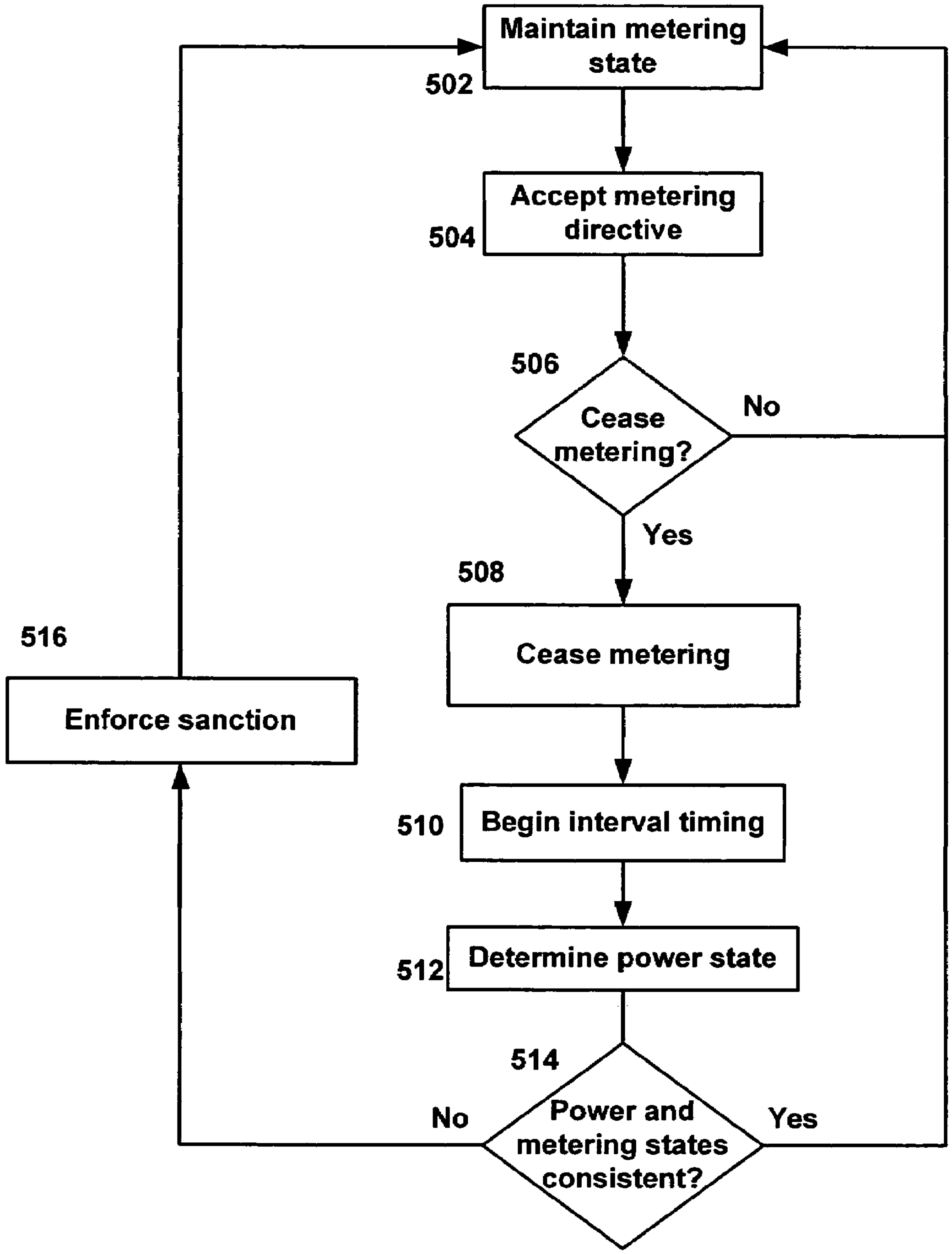
FIG. 5 a flow chart depicting a method of monitoring computer status to determine metering state.

FIG. 5 is a method of monitoring computer status to verify a change in metering state from metered to non-metered. At block 502, a computer, such as computer 110, arranged and adapted for use in a pay-per-use, subscription, or other metered environment may be in a metered state. For the sake of this example, metering by usage is assumed. The upper provisioning module 308 may receive a signal or interrupt indicating that the power state is transitioning from on to standby, for example, in response to a user logging out. The upper provisioning module 308 may send a signal to the lower provisioning module 312 indicating metering should cease at block 504. The lower provisioning module 312 may then determine if metering should be stopped at block 506, based on the current policy. When metering should continue, processing may continue at block 502 by following the no branch from block 506. When it is appropriate to stop metering, the yes branch may be followed to block 508 and metering may be stopped. To verify compliance with a policy governing metering, an interval timer may be started at block 510. At the end of the interval processing may continue at block 512 to determine the power state. The lower provisioning module 312 may directly senses power state or, as discussed above, may itself operate using power being monitored. That is, when the computer is placed in a standby mode the lower provisioning module itself may be deactivated, inherently indicating compliance with the low-power state.

In the case where the lower provisioning module itself is not deactivated and the power and metering states are determined to be consistent at block 514, the yes branch may be followed and the metering state may be maintained at block 502. When the power and metering states are found not to be consistent, for example, power is on and a user is active, but no metering is occurring, the no branch from block 514 may be taken to block 516. At block 516 a sanction may be enforced, as discussed above. For example, metering may be restarted and operation returned to block 502, or a more dramatic sanction may be imposed such as powering down the computer or a component.

The concepts and techniques discussed above take advantage of the simple fact that the usefulness of a computer is extremely limited when the power is off or in standby mode. Therefore, when in an off or standby state there may be a high degree of confidence that it is correct to stop metering. By monitoring the power state in conjunction with directives related to metering, a simple, yet effective, mechanism for reducing fraud or metering errors may be achieved.

One of ordinary skill in the art will appreciate that various modifications and changes can be made to the above embodiments, including but not limited to the use of different combinations of hardware or software for activity monitoring and sanctioning. Accordingly, the specification and drawings are to be regarded in an illustrative rather than restrictive sense, and all such modifications are intended to be included within the scope of the present patent.

We claim:

1. A method of enforcing a metering policy defining rules for metering in a pay-per-use computer comprising:

a power source and a hardware module that includes a power monitoring circuit, a timer, and a tamper-resistant memory, the method comprising:

storing in the tamper-resistant memory a metering account, a metering function, and a metering policy;

monitoring the power source by the power monitoring circuit and debiting, by the metering function, the metering account based on the monitoring and the metering policy;

determining at the hardware module that the computer is in a standby state or an off state and, based on the metering policy, sending a signal to the metering function to cease debiting the metering account;

in response to the signal, stopping the metering function and the monitoring by the power monitoring circuit and starting an interval using the timer in accordance with the metering policy;

determining at the hardware module, in accordance with the metering policy, that the interval has ended and re-monitoring the power source by the power monitoring circuit; and based on the re-monitoring, debiting the account by the metering function.

2. The method of claim 1, further comprising determining a metering state of the computer to be one of a metered state and a non-metered state.

3. The method of claim 1, further comprising shutting down the computer after debiting the account by the metering function.

4. The method of claim 1, further comprising resetting the computer after debiting the account by the metering function.

5. The method of claim 1, further comprising activating the metering function when directed to meter by a software component running on the computer.

6. The method of claim 1, further comprising activating the metering function when the computer is in an active state unless directed to cease metering by a component running on the computer.

* * * * *